United States Patent [19]

Sugiura et al.

[11] Patent Number: 4,749,289
[45] Date of Patent: Jun. 7, 1988

[54] PRINTING DEVICE FOR ATTRIBUTE PRINTING

[75] Inventors: Yoshio Sugiura, Aichi; Kiyoshi Yamakawa, Gifu, both of Japan

[73] Assignee: Brother Kogyo Kabushiki Kaisha, Aichi, Japan

[21] Appl. No.: 60,003

[22] Filed: Jun. 9, 1987

[30] Foreign Application Priority Data

Jun. 13, 1986 [JP] Japan .................. 61-138625
Apr. 20, 1987 [JP] Japan ................... 62-97036

[51] Int. Cl.⁴ .......................... B41J 29/26
[52] U.S. Cl. .......................... 400/17; 400/22; 400/63; 400/210; 400/304; 400/696
[58] Field of Search ............ 400/22, 210, 304, 63, 400/17, 279, 696, 697, 697.1; 364/518, 519

[56] References Cited

U.S. PATENT DOCUMENTS

| | | | |
|---|---|---|---|
| 3,913,721 | 10/1975 | Koplow | 400/63 |
| 4,084,680 | 4/1978 | Deetz | 400/63 |
| 4,323,315 | 4/1982 | Demonte | 400/22 X |
| 4,500,216 | 2/1985 | Demonte | 400/210 X |
| 4,686,649 | 8/1987 | Rush | 400/63 X |
| 4,692,045 | 9/1987 | Makita | 400/210 X |

FOREIGN PATENT DOCUMENTS

| | | | |
|---|---|---|---|
| 2265013 | 11/1975 | Fed. Rep. of Germany | 400/63 |
| 63675 | 5/1981 | Japan | 400/304 |
| 13591 | 1/1985 | Japan | 400/304 |
| 143989 | 7/1985 | Japan | 400/22 |

Primary Examiner—Paul T. Sewell
Attorney, Agent, or Firm—Parkhurst & Oliff

[57] ABSTRACT

In a printer for printing an attributed character by printing a character part and an attribute part separately, the invented printer or typewriter is so constructed that only an attribute part, e.g., an underline part or a bold face part, is printed in case a printed character is detected to already have the attribute, i.e., is underlined, or bold face, thereby preventing a character part of the printed character from being double printed. This results in improved quality in printed characters and in complete clear character erasures. The printer is also effective for overprinting attribute parts to over a desired range of printed characters.

10 Claims, 11 Drawing Sheets

PRINTING DEVICE FOR ATTRIBUTE PRINTING

BACKGROUND OF THE INVENTION

1. Field of the Invention

This invention relates to a printing device of a typewriter or the like, more particularly to the one provided with a mechanism for overprinting either a same character or a different character to a printed character twice or more, so that an attributed character, i.e., a character with a special print effect like a character with an underline or that with a bold face, is printed. The invention further relates to a printing device of a typewriter, specifically, to the one for overprinting characters, those excluding underline and bold face, in spite of being in an underline or bold printing mode, where the character is already underlined or bold.

2. Discussion of Background

One of the prior art English typewriters is well known for having a correction mechanism which erases a word already printed on a printing paper. In the mechanism, a same type as the printed character is hit several times with its position slightly dislocated via a correction tape on which a sticking agent is applied. Accordingly, the printed character formed by an adhesion of the carbon powder is erased because the adhered powder is removed by the agent. In the above correction mechanism, however, the same type is required to be hit twice or more at the same position.

The prior art typewriter with an automatic correction mechanism of another type has been also provided which has a line buffer for storing printed characters by a line. When a print head is moved to a character position to be erased and a correction key is operated, the same type as the printed character is selected based upon the data stored in the line buffer so that the character is erased.

The typewriter of other type has an overprinting mechanism in which another character, either the same as or different from an already printed character, is overprinted at the same position thereof so as to provide more printing possibilities. For example, the aforementioned typewriter has a function of bold printing by typing a same type with its position slightly dislocated twice or more in order to emphasize a certain character. The other typewriter has a function in printing a character part and an underline part at the same position by which a character with underline is printed. Such a complicated function as an overprinting twice or more at the same printing position is automatically executed by a printing device through the operation of a specific key designed for the execution.

In case of erasing the overprinted character, a plurality of erasing operations are executed in such a manner that the character is erased just as it was printed.

The aforementioned printing devices are so constructed that, in the case of printing an attributed character, the attribution is automatically executed by overprinting the attribute part on the character part upon operating the character key together with the key for printing the attributed character. The attribute printing, however, will cause some drawbacks. When an already printed character is required to be attributed, the character part results in being printed twice, since an attributed character is overprinted on the printed character. In case that the print head is out of position even slightly, the width of the character part would be more than other printed characters, causing non-uniformity in the printed characters. Moreover, since at the position where the character is overprinted, a carbon powder of a print ribbon is adhered thicker than that adhered to other parts, the correction ribbon fails to completely remove the carbon powder, resulting in incomplete character erasing.

In a typewriter having a printer with an automatic underline mechanism, for example, the printed character is automatically underlined upon setting an auto underline mode.

In the typewriter with an automatic underline function in case of printing a composite character by overprinting two or more character, e.g., "¥" with "Y" and "=", in an automatic underline mode, the underline is printed twice or more. Accordingly, the thickness of the underline part would be more than other parts, thereby deteriorating printing quality and requiring more time to print the composite character with the underline, resulting in printing inefficiency and erasure difficulties.

SUMMARY OF THE INVENTION

An object of the invention is to provide a printing device in which only an attribute part, e.g., an underline part or a bold part, of an attributed character is overprinted on the already printed character without overprinting the character part itself, providing uniform quality of printed characters.

Another object of the invention is to provide a printing device in which a correction device stores the attribution information existing in a printed character in a memory, whereby the attributed character, both the character part and the attribute part, can be erased.

A further object of the invention is to provide a printing device in which an attribute, e.g., an underline or bold face typing, is furnished for every character within a desired range of a printed text, where the range can be defined simply by operating specific keys.

A printer embodied in accordance with the present invention, for printing an attributed character composed of a character part and an attribute part by printing the character part and the attribute part separately, includes: a character memory for storing a plurality of character data, each representative of a printed character including information of the character part of the printed character and information of the attribute part of the printed character; a pointer memory for storing pointer data representative of an address of the character data in the character memory, the character data corresponding to the printed character on which a print head is located; and an attribute print means, responsive to a command from outside for printing the attribute part if the printed character on which the print head is located does not have the attribute part and for preventing to print the attribute part if the printed character has the attribute part.

BRIEF DESCRIPTION OF THE DRAWINGS

These and other objects and advantages of the invention may be readily ascertained by referring to the following description and appended drawings in which.

DETAILED DESCRIPTION OF PREFERRED EMBODIMENTS

Figure 1:
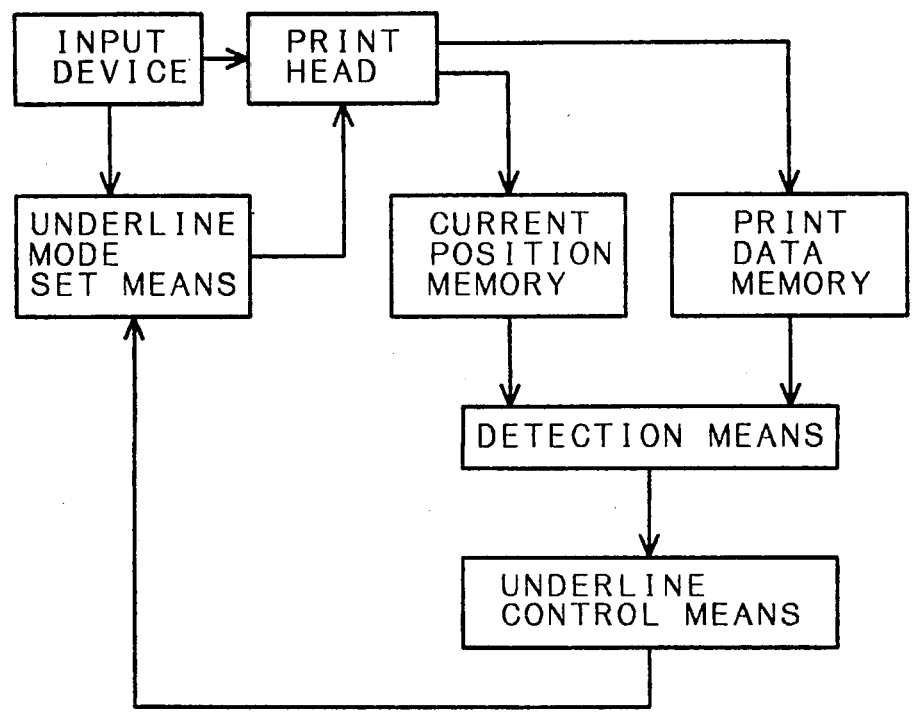
FIG. 1 is a block diagram illustrating a function of a printing device based on a first embodiment of the present invention.

Hereinafter, a first embodiment of the present invention will be described referring to the drawings.

As shown in a block diagram of FIG. 1, in a printing device embodied in accordance with the present invention, a character, i.e., letters, numerals, symbols or the like, corresponding to a data input through an input device is printed on a printing media by a print head. A current position of the print head is stored in a current position memory. The data corresponding to the character printed on the printing media is also stored in a print data memory.

Upon setting an underline mode by an underline set device, a character is printed with an underline.

In overprinting, for example for printing a character "Y" with "Y" and "=", in reference to the data in the current position memory and the data in the print data memory, a detection part determines whether a printed character already has an underline. If the printed character is detected to already have an underline, the underline control part does not underline the character.

A more concrete description of the first embodiment is hereinafter explained.

Figure 2:
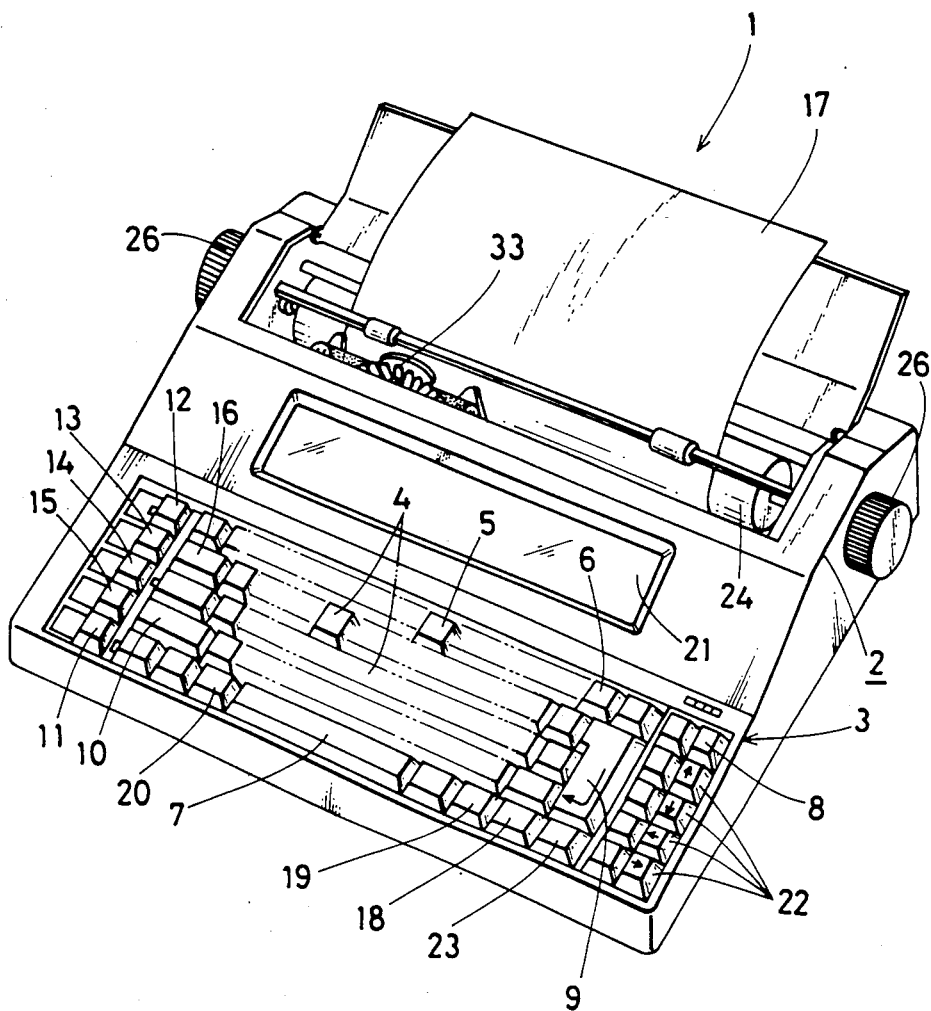
FIG. 2 is a perspective view illustrating an electronic typewriter of the first embodiment.

Referring to FIG. 2, in this embodiment, the invention is applied to an electronic typewriter 1. This typewriter 1 is so constructed that an excessive underline is not printed in the underline mode, if printing a composite character would result in overprinting two or more characters.

A keyboard 3 is provided on the fore part of a main body frame 2 of the electronic typewriter 1. A printing mechanism (hereinafter referred to as PM) is employed within the frame 2, which is behind the keyboard 3.

The keyboard 3 has various keys as follows: character keys including alphabet keys 4, numeral keys 5, and symbol keys 6; a space key 7; a backspace key 8; a return key 9; a shift key 10; a repeat key 11; a right indent key 12; a right and left margin set key 13; a tab and decimal tab set key 14; a tab clear key 15; a tab key 16; a paper feed key 18; a paper back feed key 19; a code key 20; a cursor move key 22; and an underline key 23 (ON/OFF key) for setting an auto underline mode. Each function obtained by operating the respective keys as mentioned above is the same as those of a conventional electronic typewriter.

A display 21 is provided on the frame 2 upward the keyboard 3, which displays characters input through the alphabet keys 4, numeral keys 5, symbol keys 6, the space key 7, or the like. A platen 24, transversely placed within the frame 2, is rotationally driven either automatically by a platen drive motor 25 or manually by a platen knob 26, thus feeding a printing paper 17.

Figure 3:
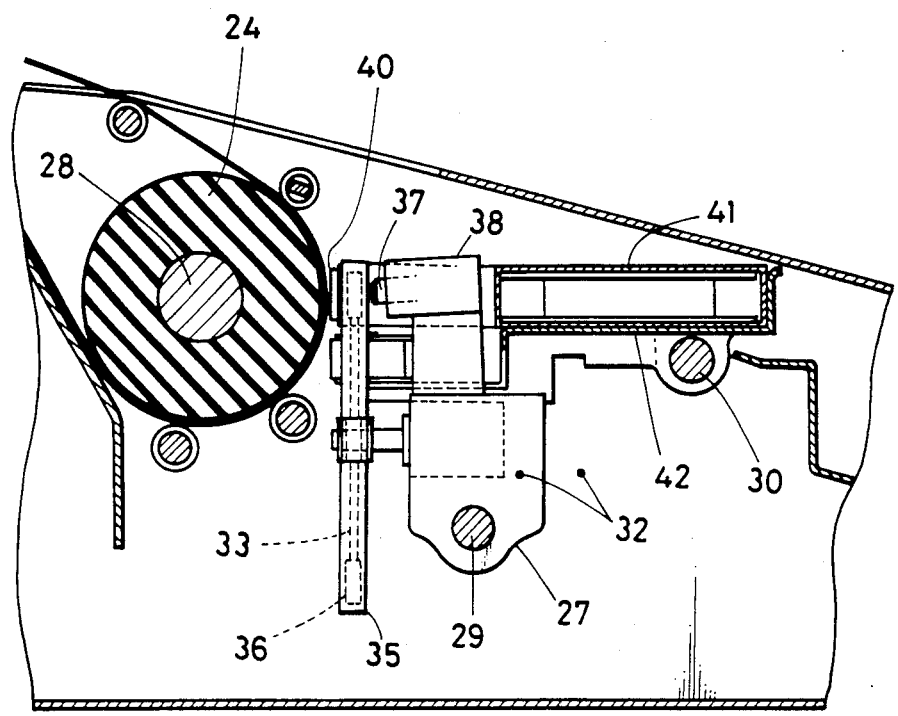
FIG. 3 is a side view of a vertical section of a main part of the electronic typewriter in FIG. 2.
Figure 4:
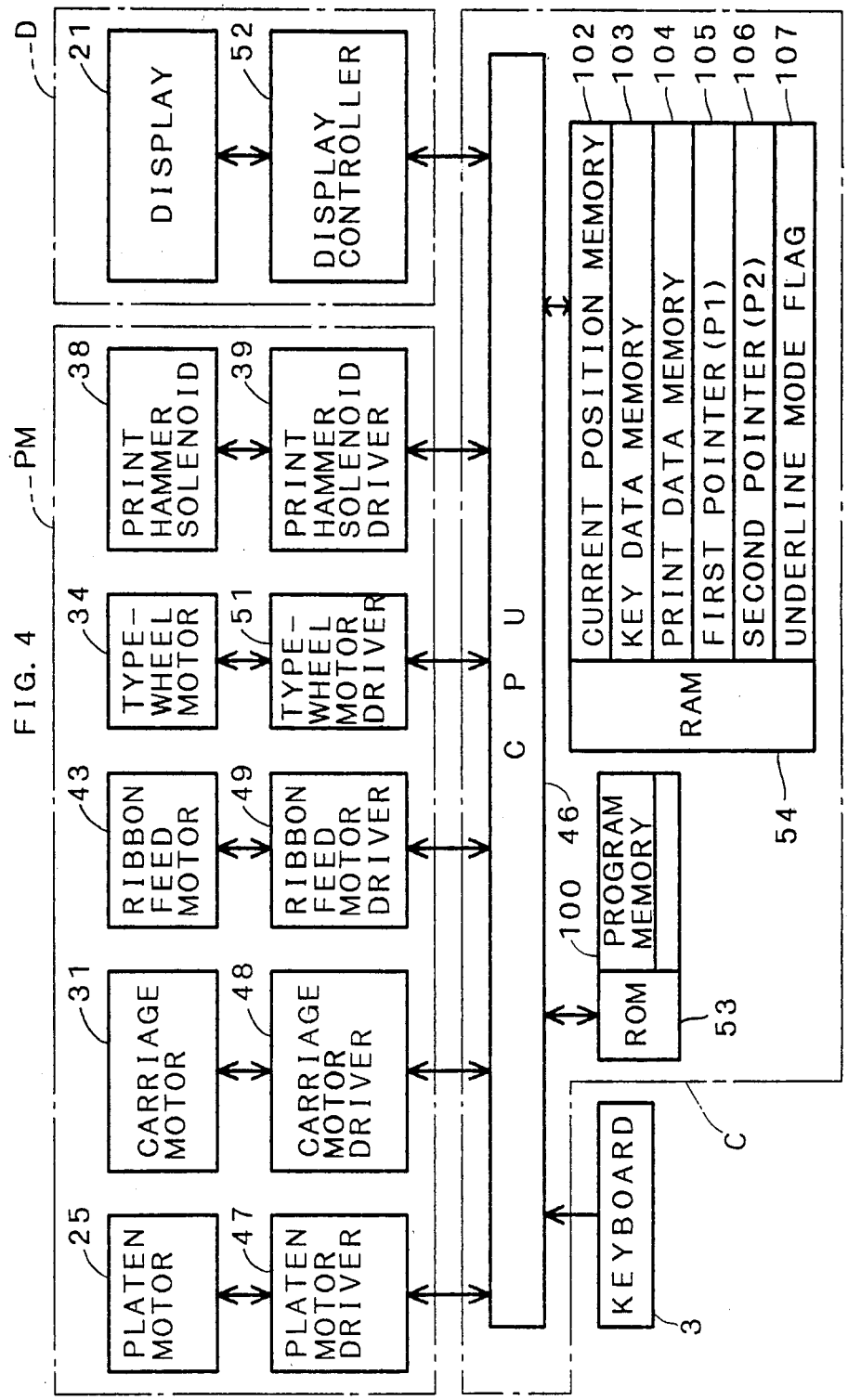
FIG. 4 is a block diagram illustrating a control system of the typewriter.

As shown in FIGS. 3 and 4, a carriage 27 is supported by two guide axles 29 and 30 which are provided parallel to a platen axle 28 to be moved along the platen 24 via a wire 32 which is driven by a carriage motor 31.

A type wheel motor 34 for rotating a type wheel 33 is provided on the carriage 27. As shown in FIG. 3, the type wheel 33 in a detachable wheel cassette 35 is driven to rotate so that a selected type 36 of the wheel 33 is set to a printing position facing to a print hammer 37. The print hammer 37 is attached onto a top of the carriage 27. A print hammer solenoid 38 is driven by a print hammer solenoid driver 39, so as to hit the selected type 36 set to the printing position onto the printing paper 17.

A ribbon cassette 41 including a print ribbon 40 is held on a holder 42, a fore end of which is rotatably attached to the carriage 27. The print ribbon 40 is supplied by a supply spool and is wound by a takeup spool which is driven by a ribbon feed motor 43.

An electric construction of control system of the typewriter 1 will be described referring to a block diagram of FIG. 4.

A driving system for the PM includes: a platen motor 25 and a platen motor driver 47; a carriage motor 31 and a carriage motor driver 48; a ribbon feed motor 43 and a ribbon feed motor driver 49; a type wheel motor 34 and a type wheel motor driver 51; and a print hammer solenoid 38 and a print hammer solenoid driver 39.

A display device D includes a liquid crystal display 21 and a display controller 52.

Control system C includes a CPU 46, ROM (Read Only Memory) 53, and RAM (Random Access Memory) 54. Both ROM 53 and RAM 54 are connected to the CPU 46. The keyboard 3; the drivers 39, 47 through 49, and 51 of the aforementioned driving system; and the display controller 52 are respectively connected to the CPU 46.

The ROM 53 has a program memory 100 including the following programs: a print control program for controlling each motor 25, 31, 34, and 43, the hammer solenoid 38 of the PM, and the display 21 in accordance with either code data including character data and control data input through the keyboard 3, or with code data read out from a print data memory (described later); a function control program for controlling the motors 25, 31, 34, and 43, and the hammer solenoid 38 in accordance with code data of the respective functions input through each function key of the keyboard 3; and an underline print control program for executing or preventing underline printing.

The RAM 54 includes: a current position memory 102 for storing a current position of the carriage 27 (i.e., of the print head) corresponding to a printing position; type position memory for storing the type 36 at the current printing position as determined by a rotation angle of the type wheel 33; a key data memory 103 for temporarily storing code data of a character input through the keys 4, 5, 6, and 7, with both displacement data (pitch data) of the carriage 27 and underline data till the character is printed onto the printing paper 17; a print data memory 104 for storing data in the key data memory 103 after printing in their order of printing and in correspondence to the printed position; a first pointer (P1) 105 for indicating an address where the data are stored in the memory 104, and for proceeding two addresses each time the data is input; a second pointer (P2) 106 for indicating an address in the memory 104 corresponding to the current position of the print head and for proceeding two addresses each time the print head moves by one character; an underline mode flag 107 for being set when the underline key 23 is operated to set an auto underline mode; and various memories for temporarily storing data calculated by the CPU 46.

The CPU 46 orders the PM to execute printing on the printing paper 17 in accordance with the code data corresponding to characters which are input through the keys 4, 5, 6, and 7 of the keyboard 3 to be stored in the key data memory 103. The CPU 46 stores the data of printed characters in the print data memory 104 in accordance with the printed position, and stores the data of current positions, which vary upon driving either the carriage motor 31 or the type wheel motor 34, within the current position memory 102 and the type position memory of the RAM 54.

The CPU 46 outputs a control signal to each driver 39, 47, 48, 49 and 51 of the PM, and to the display controller 52 by processing the code data input through various function keys of the keyboard 3 with a control program read out from the program memory 100 of the ROM 53.

The CPU 46 further processes code data of characters either input through the keys 4, 5, 6, and 7, or characters read out from the print data memory 104, by using the control program read out from the program memory 100. Accordingly the CPU 46 outputs control signals corresponding to the code data to the drivers 39, 47, 48, 49 and 51 of the PM and to the display controller 52, thereby controlling the PM and the display device D.

In case of controlling the PM based on code data, the CPU 46 outputs a control signal to the type wheel motor driver 51 which then generates a driving current to the type wheel motor 34. The motor 34 rotates by a predetermined angle to bring a type 36 of the type wheel 33 corresponding to the data into a position facing the print hammer 37.

Upon generating the control signal from the CPU 46 to the hammer solenoid driver 39, the driver 39 generates a driving current to the hammer solenoid 38 to make the print hammer 37 hit the type 36 of the wheel 33, by which the character is printed on the printing paper 17.

The carriage motor driver 48 outputs a driving current to the carriage motor 31, by which the carriage 27 is moved by one typing pitch in the printing direction via the wire 32. At the same time, the ribbon feed motor driver 49 also outputs a driving current to the ribbon feed motor 43 by which the print ribbon 40 is fed.

In case of operating the return key 9, the CPU 46 generates control signals to both the carriage motor driver 48 and the platen motor driver 47 by processing the return code data through the keyboard 3 with a control program read out from the program memory of the ROM 53. Then, the driver 48 generates a driving current to the carriage motor 31 which is reversely rotated to bring the carriage 27 back to the left margin position. At the same time, the driver 47 generates a driving current to the platen motor 25 which feeds the printing paper 17 by the line.

When the underline key 23 is operated to set an auto underline mode, the CPU 46 executes the underline control program read out from the program memory 100, then outputs a control signal to the type wheel motor driver 51 for printing characters corresponding to the code data with an underline. After the character corresponding to the code data is printed, an underline type of the type wheel 33 is brought into the printing position facing the print hammer 37. Upon driving the print hammer solenoid 38, an underline is printed beneath the character.

An explanation of underline printing control will be described referring to FIGS. 5A through 5C. This control is executed to stop double underlining in case of overprinting on the printed underlined characters in the auto underline mode.

Figure 5:
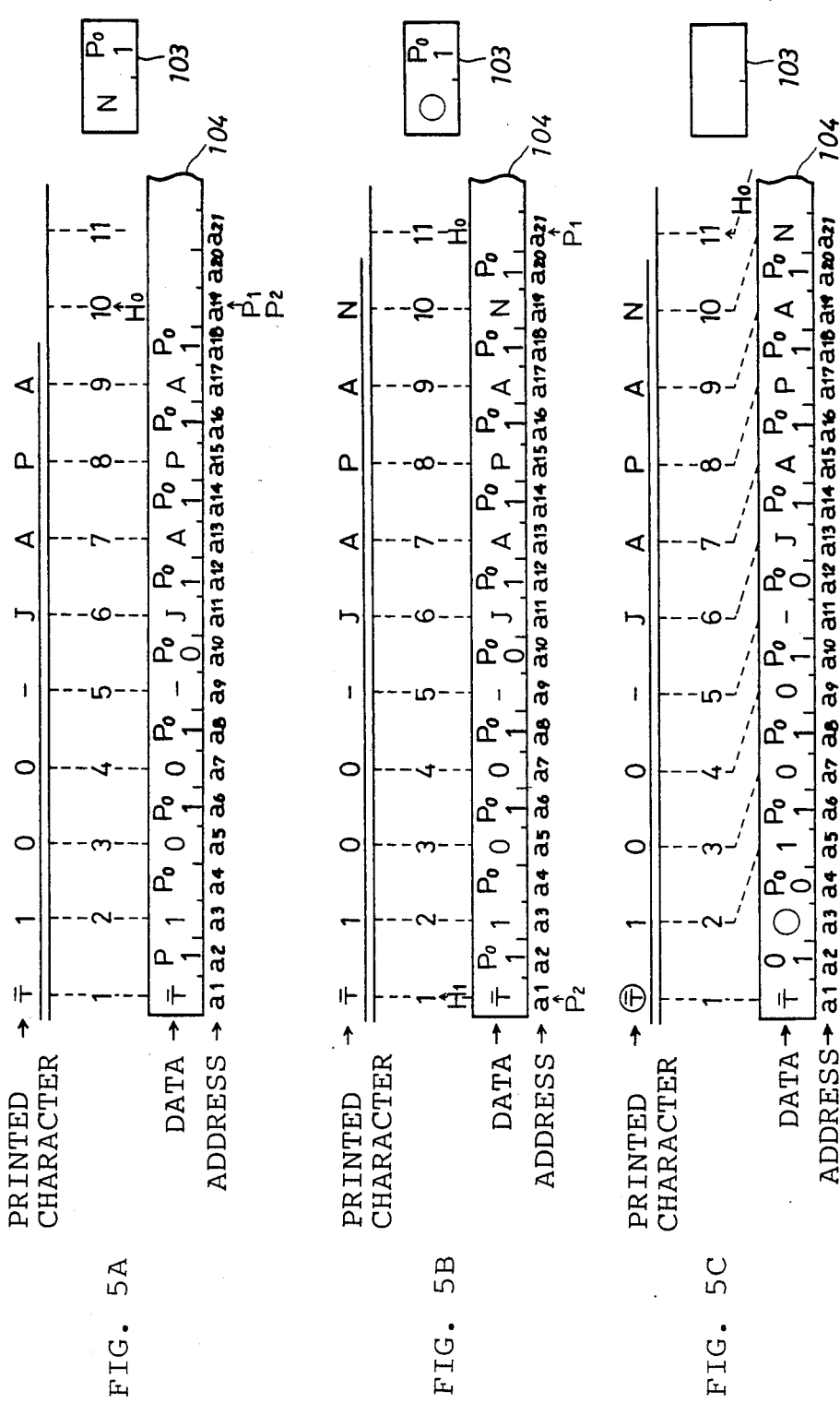
FIGS. 5A through 5C are explanatory views showing relationships among printed characters, data stored in a print data memory, and data stored in a key data memory.

FIGS. 5A through 5C respectively show printed characters "⊕100-JAPAN", its corresponding data within the print data memory 104, and the data within the key data memory 103.

Since the auto underline mode is set at the first point, those printed characters are underlined.

Referring to FIG. 5A, in the print data memory 104, printed character data, pitch data Po, and underline data are stored, responsive to the printed character queue "〒100-JAPA". While in the key data memory 103, input character data "N", and an underline data which are to be printed next are stored along with pitch data Po.

For example, when a symbol "〒" (Japanese ZIP code symbol) is printed at the first point, the symbol is stored in an address a1 of the data memory 104, and its pitch data Po and an underline data "1" (When not in auto underline mode, the data is "0".) are stored in an address a2 of the memory 104. Both addresses a1 and a2 correspond to the first point.

When the print head is at the 10th point (position Ho of FIG. 5A) where the character "N" is to be printed, both the first pointer (P1) 105 and the second pointer (P2) 106 point to an address a19 corresponding to the 10th point in the memory 104. Then, when the "N" is printed with an underline, the data within the memory 103 are respectively stored in addresses a19 and a20 within the memory 104, as shown in FIG. 5B. Referring to FIG. 5B, in case of moving the print head to the first point (position H1) and operating a symbol key " ○ ", order to print the " ○ " over " 〒 " at the first point, the data of the input symbol " ○ " is stored within the key data memory 103. At this time, the second pointer (P2) 106 points to address a1 in the memory 104.

When the " ○ " is overprinted at the first point, the data at the address a1 is detected with the second pointer (P2) 106. If a code data already exists, for example " ○ " in this case, as shown in FIG. 5B, the data at the next address a2 is detected as to whether the underline data is "1" or "0".

Then the second pointer 106 points an address a3, and all the data behind the address a3 are shifted rightward by two addresses. At the address a3, the code data for the symbol " ○ " is stored. At an address a4, the pitch data Po and the underline data "0" are stored. At an address a2 corresponding to the symbol "〒" at the first point which is overprinted, the pitch data "0" is stored. As the underline data "1" has been already stored in the address a2 to be in the auto underline mode, the underline data of the symbol " 〒 " to be overprinted is stored as "0", whereby double underline printing can be prevented.

Figure 6:
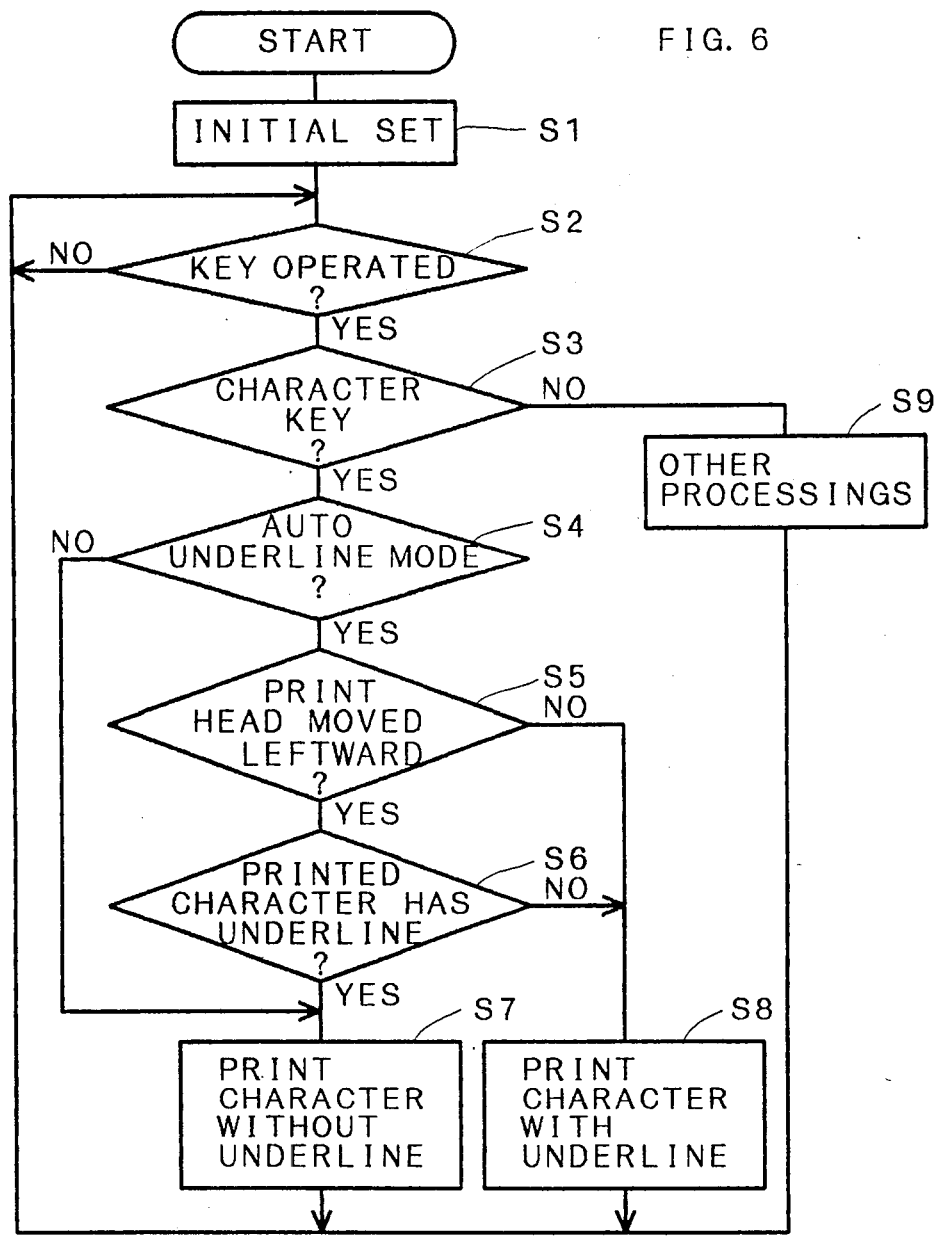
FIG. 6 is a flow chart representing a routine executed for controlling underline printing.

Referring to a flow chart of FIG. 6, a routine of underline print control executed by the control system of an electronic typewriter of this invention will be described.

When the typewriter is switched ON, this routine starts. At step S1 (hereinafter referred to as simply S1, as are further steps), for example, the underline mode flag 107 is initially reset to 0. The program proceeds to S2 where it is determined if any key has been operated. In case a key is not operated, the S2 is repeatedly executed. When any key is operated, the program proceeds to S3 where it is determined if the key is one of character keys 4, 5, or 6. If the determination is YES, the code data corresponding to the character key 4, 5, or 6 is stored in the key data memory 103. The program then proceeds to S4. Conversely, when the operated key is not any of character keys 4, 5, nor 6, the program goes to S9 where usual processing in accordance with the operated function keys is executed, then the program returns to S2.

At S4, the determination is made whether or not the auto underline mode is set, as based upon the data of the underline mode flag 107. If in the auto underline mode, i.e., the flag 107 is set, the program proceeds to S5. If not, i.e., the flag 107 is reset, the program goes to S7.

At S5, based on the data of both the first pointer (P1) 105 and the second pointer (P2) 106, and on the current position memory 102, it is determined whether the print head moves leftward from the last printed character, i.e., as shown in FIG. 5B, whether an address of the second pointer (P2) 106 is smaller than that indicated by the first pointer (P1) 105. If the print head is detected to have moved leftward, the program proceeds to S6. If not, the program goes to S8.

At S6, based on the data in the current position memory 102 and the data in one address behind that indicated by the second pointer (P2) 106, it is determined whether the printed character is underlined, i.e., whether or not the underline data is 1. If underlined, the program proceeds to S7. If not, the program goes to S8.

At S7, in case that the underline data in the key data memory 103 is 1, the data is reset to 0; a character corresponding to the data in the key data memory 103 is printed without an underline at the current printing position; and the data in the memory 103 is stored in the printing data memory 104 pointed to by the second pointer (P2) 106 (FIG. 5C). The program then returns to S2. In printing the character, the CPU 46 outputs control signals to the type wheel motor driver 51, print hammer solenoid driver 39, and the carriage motor driver 48, respectively.

At S8, at the current printing position, a character corresponding to the data in the key data memory 103 is printed with an underline, and the data is stored in the print data memory 104 pointed to by the second pointer (P2) 106. The program then returns to S2.

As mentioned above, in case of overprinting to an underlined printed character in an auto underline mode, the printing is executed without underlining, thereby uniforming the depth of underlines and avoiding unnecessary underlining to accomplish effective printing.

This invention may be so constructed to execute overprinting without underline to a non-underlined printed character in an auto underline mode.

Although this embodiment has been described on the application for a printer of daisy-wheel type, it will be applicable for typewriters with thermal printer or of ball type, and for either Japanese, or English word processors.

Hereinafter, a second embodiment of the present invention will be described referring to drawings. In this embodiment, a printer embodied in accordance with the present invention is employed into an electronic typewriter 1 having an automatic correction mechanism.

Figure 7:
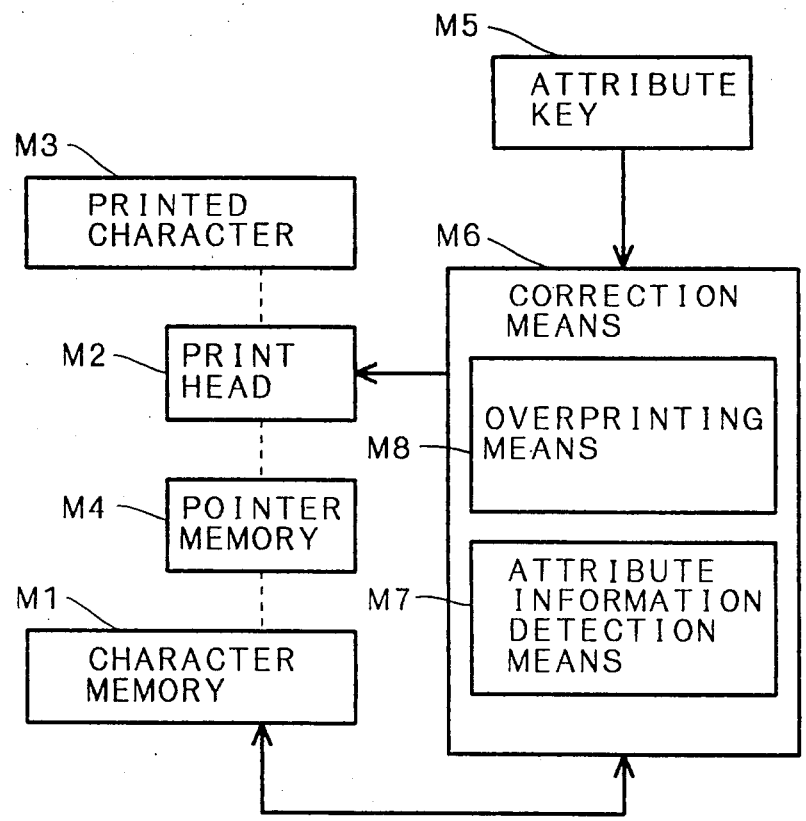
FIG. 7 is an explanatory block diagram showing a brief construction of a second embodiment.

Referring to FIG. 7, a brief explanation of this embodiment is described.

In case a print head M2 is moved to a character position M3 already printed and an attribute key M5 is operated, correction means M6 executes attribute printing on the character by printing only the attribute part. The correction means M6 furnishes an attribute information to a character data corresponding to the printed character. Upon operating the attribute key M5, a detection means M7 detects whether a character data in a character memory M1 addressed by a pointer memory M4 has attribute information. If the character data has the attribute information, overprinting means M8 prints nothing. Conversely, if the character data does not have such information, the overprinting means M8 overprints only the attribute part on the character.

More detailed description of the second embodiment is explained.

Figure 8:
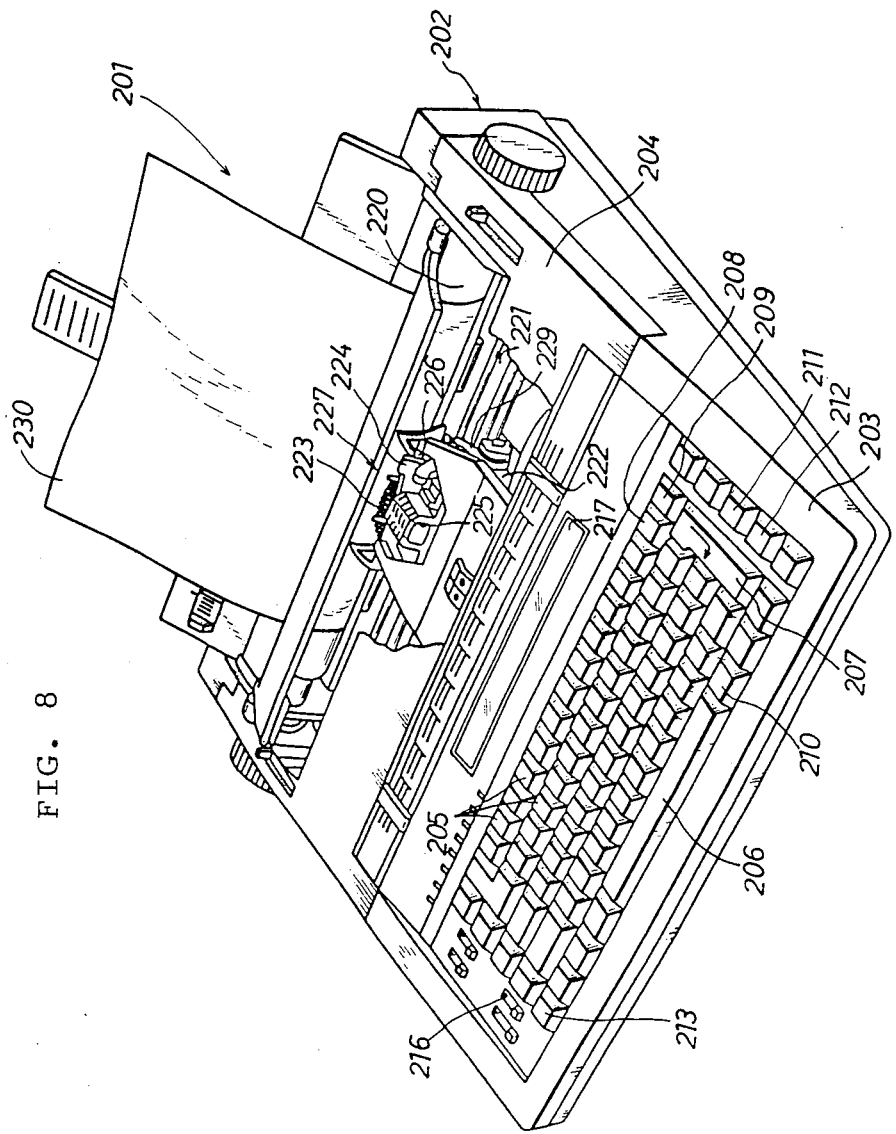
FIG. 8 is a perspective view illustrating an electronic typewriter in the second embodiment.

FIG. 8 is a perspective view illustrating the typewriter 201 of the second embodiment.

The typewriter 201 includes a keyboard 203 attached upon a frame 202, a printing portion 204 provided between the keyboard 203 and the frame 202, and an electronic control unit (ECU) 300.

The keyboard 203 includes character keys 205, a space key 206, a return key 207, a backspace key 208, a wordback key 209, a correction key 210, a bold key 211, an underline key 212, a code key 213, and various function keys and switches such as a pitch selector switch 216. A liquid crystal display 217 is provided above the keyboard 203, which displays printed character or messages for an operator.

The wordback key 209 functions in backing a printing position leftward word by word. When the wordback key 209 is operated, the print head (described later) goes leftward to the topmost character position of the word on which the print head is located. Further operation of the wordback key 209 moves the print head to the topmost character position of the left neighbor word. The bold key 211 is for printing a bold face character. The underline key 212 is for printing an underlined character. The code key 213 is operated together with other keys, so as to generate code data which are different from that generated when such key is solely operated. When the code key 213 and the bold key 211 are operated at the same time, a bold conversion (hereinafter referred to as BR) key function is obtained. The bold conversion key function is for converting an already normally printed character into a bold face character. When the code key 213 and the underline key 212 are operated at the same time, an additional underline (ULR) key function is obtained. The additional underline key function is for adding an underline beneath an already printed character.

A platen 220 is rotatably attached within the frame 202. A carriage 222 supported by a guide axle 221 is movably provided along with the platen 220 in a transverse direction. The platen 220 is driven by a stepping motor 352 for line by line feeding. The carriage 222 is driven by a stepping motor 354. On the carriage 222, a print head 227 including a type wheel 224 of cassette type with a plurality of types 223 circularly arranged, a print hammer 225, and a print ribbon 226 is installed. A stepping motor 362 for a type wheel 224 is provided on the carriage 222 for selecting one of the types 223.

Via the print ribbon 226, the print hammer 225 hits the type 223 onto a printing paper 230 set around the platen 220. Then the carbon powder on the surface of the ribbon 226 adheres to the paper 230, thereby characters are printed. A correction mechanism for erasing printed characters is provided on the carriage 222. By hitting the same type as the printed character thereto via a correction tape 229, the carbon powder forming the character is removed.

Figure 9:
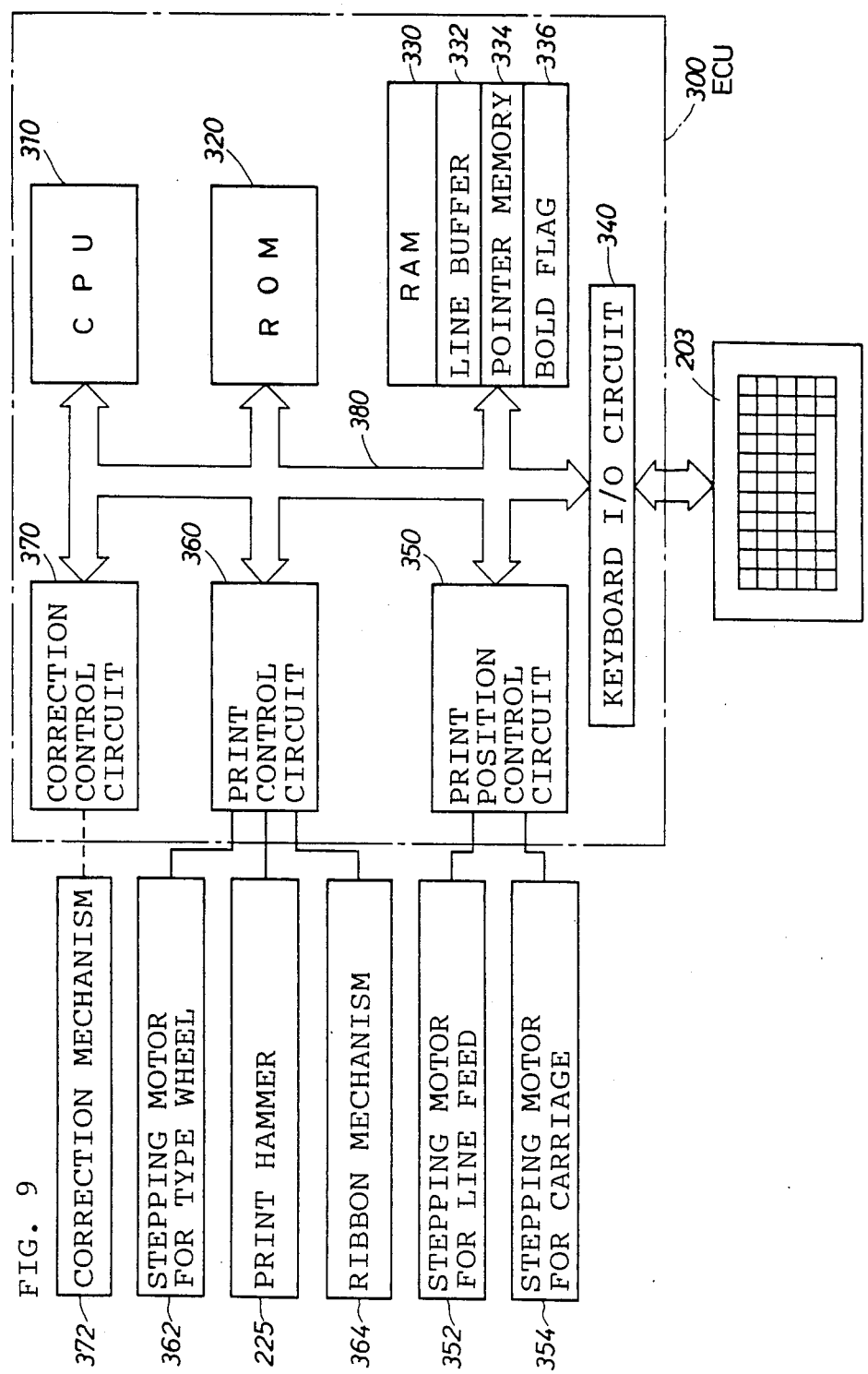
FIG. 9 is a block diagram illustrating a construction of an electronic control system of the typewriter in this embodiment.

The ECU 300 is a microcomputer having CPU 310, ROM 320, and RAM 330, as shown in FIG. 9. The ECU 300 further includes as follows: a keyboard input/output (I/O) circuit 340 for inputting or outputting data through the keyboard 203 with the display 217; a printing position control circuit 350 which is connected to the stepping motor 352 for line feeding and to the stepping motor 354 for the carriage 222 movement; a print control circuit 360 which is connected to a stepping motor 362 for the type wheel, the print hammer 225, and a ribbon mechanism 364; a correction control circuit 370 which is connected to a correction mechanism 372; and a bus line 380 for connecting each element. The CPU 310, according to various programs previously stored in the ROM 320 for controlling the typewriter 201, controls the print head 227, the carriage 222, and the platen 220 via the control circuits 350, 360, and 370, based on the printing data coming from the keyboard 203, whereby various functions such as character printing are executed. Along with the aforementioned control programs, the ROM 320 further stores a preset value for the initial setting of the typewriter 201, and reference data used in various control. The RAM 330 includes a line buffer 332 for storing character data by the line, a pointer memory 334 for indicating the character data location corresponding to the print head position within line buffer 332, a bold flag 336 for determining whether bold printing has been executed, and regions for temporarily storing data in controlling the typewriter 201.

Figure 10:
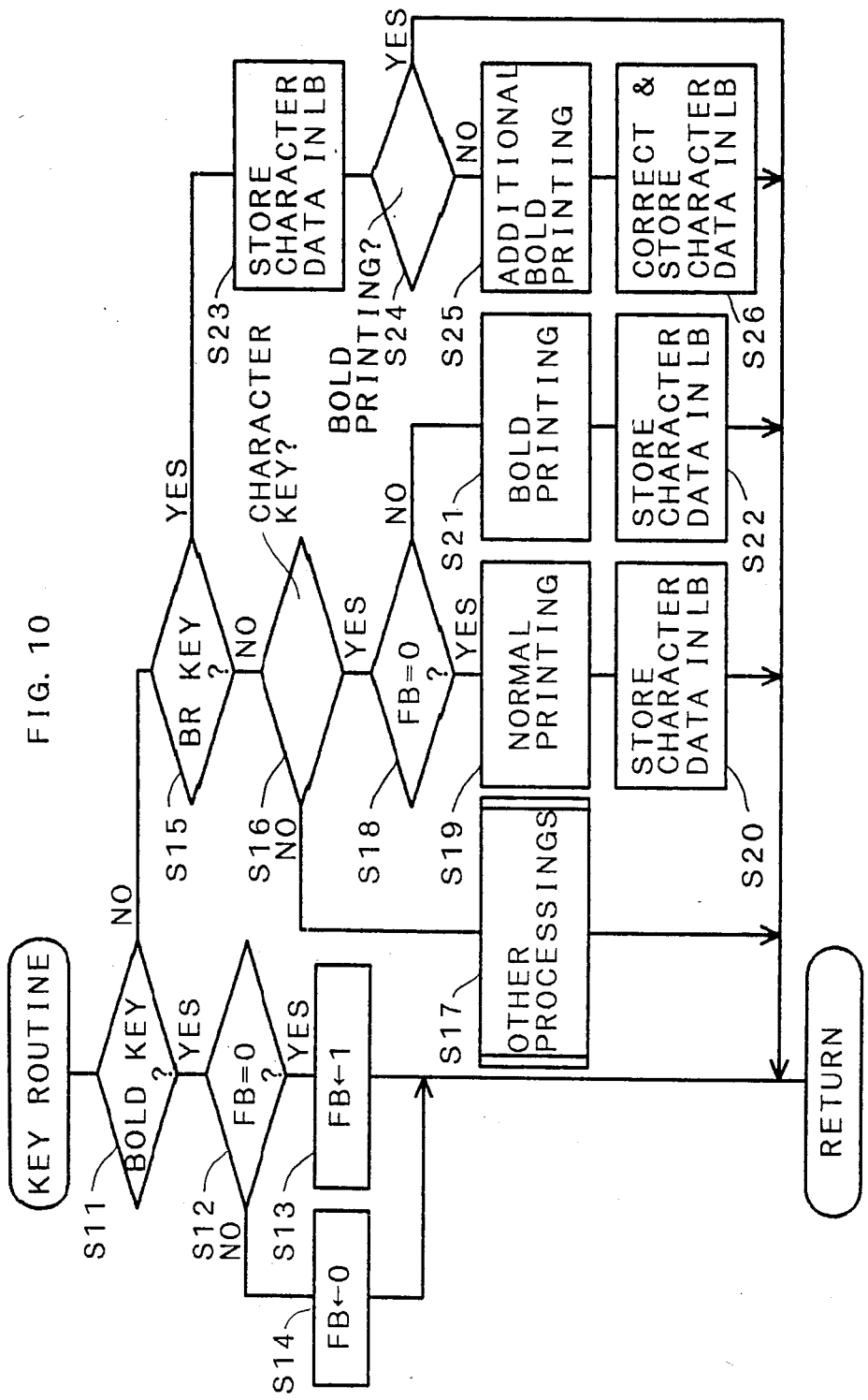
FIG. 10 is a flow chart showing a routine executed upon operation of either a bold key or a bold conversion key of the typewriter.

Functions of the typewriter 201 embodying this invention will be described referring to a flow chart of FIG. 10. The CPU 310 executes a routine shown by the flow chart every time any key is operated on the keyboard 203.

Upon a key operation to start the processing routine, S11 determines whether the operated key is the bold key 211. If the determination is YES, the program proceeds to S12 where it is determined whether a bold flag (FB) 336 is 0. If the FB is 0, the program proceeds to S13 where the FB is set to 1. Conversely, if the FB is not 0, i.e., the FB is 1, the program goes to S14 where the FB is reset to 0. Those processings signify switching the FB from 0 to 1 or vice versa every time the bold key 211 is operated. If the determination at S11 is NO, the program proceeds to S15 where a determination is made whether the operated key is a bold conversion (BR) key (the code key 213 and the bold key 211 are simultaneously operated). If the determination is NO, the program further proceeds to S16 where determination is made whether the key is one of the character keys 205. When the determination is NO, the program proceeds to S17 where an adequate processing corresponded to the operated key is executed.

When S16 determines that the operated key is the character key 205, the program proceeds to S18 where it is determined whether FB is 0. If FB is 0, the program proceeds to S19 where normal printing is executed. This execution includes moving the carriage 222 by one character pitch after printing. The program further proceeds to S20 where a character data of the printed character is stored within the line buffer (LB) 332, then the present routine is terminated.

A character data is composed of 2 bytes, one byte is an ASCII code representing a character, and the other byte is an attribute datum including information of character additions (attribute) and information of typing pitch. For example, a character printed in bold face has 1 as its first bit. An underlined character has 1 as its second bit. The character data stored in the LB at S20 do not contain those addition data, thus, both the first bit and the second bit are 0.

If the FB is not 0 at S18, the program goes to S21 where bold printing of the operated character key 205 is executed. Specifically, the type 223 corresponding to the operated key 205 is hit three times with the carriage 222 slightly dislocated at each time. After such printing, the carriage 222 is controlled to move rightward by one character pitch from the center of the bold printing. At S22, the character data of the printed character, in which the first bit of the second byte is 1, are stored in the LB.

In case S15 determines that the operated key is the BR key, the program proceeds to S23 where the character data addressed by a pointer memory (PM) are read out from the LB. Then S24 determines the character data's bold printing information, i.e., whether the first bit of the latter byte of the character data is 1. If the determination is NO, i.e., the character is determined not to be bold printed, the program proceeds to S15 where additional bold printing to the character is executed. Specifically, bold printing is executed only twice with the carriage 222 slightly dislocated at each time from the originally printed character. Since the exact site of the printed character is not double printed, upon erasing the character with the correction ribbon, the character is completely erased. After printing, the carriage 222 is moved rightward by one character pitch from the central printed position of the bolded character. At S26, the first bit of the second byte of the character data within the LB is set at 1, and the present routine is terminated. Thus, the character data in the LB of the additionally bold printed character has a bold print data. In case of correcting the character, erasure processings for bold printed characters is executed, and the character is completely erased.

When S24 determines that the character data has information indicating boldness, the program is terminated with no further processings, since the character which has been already bold printed requires no more bold printing.

Figure 11:
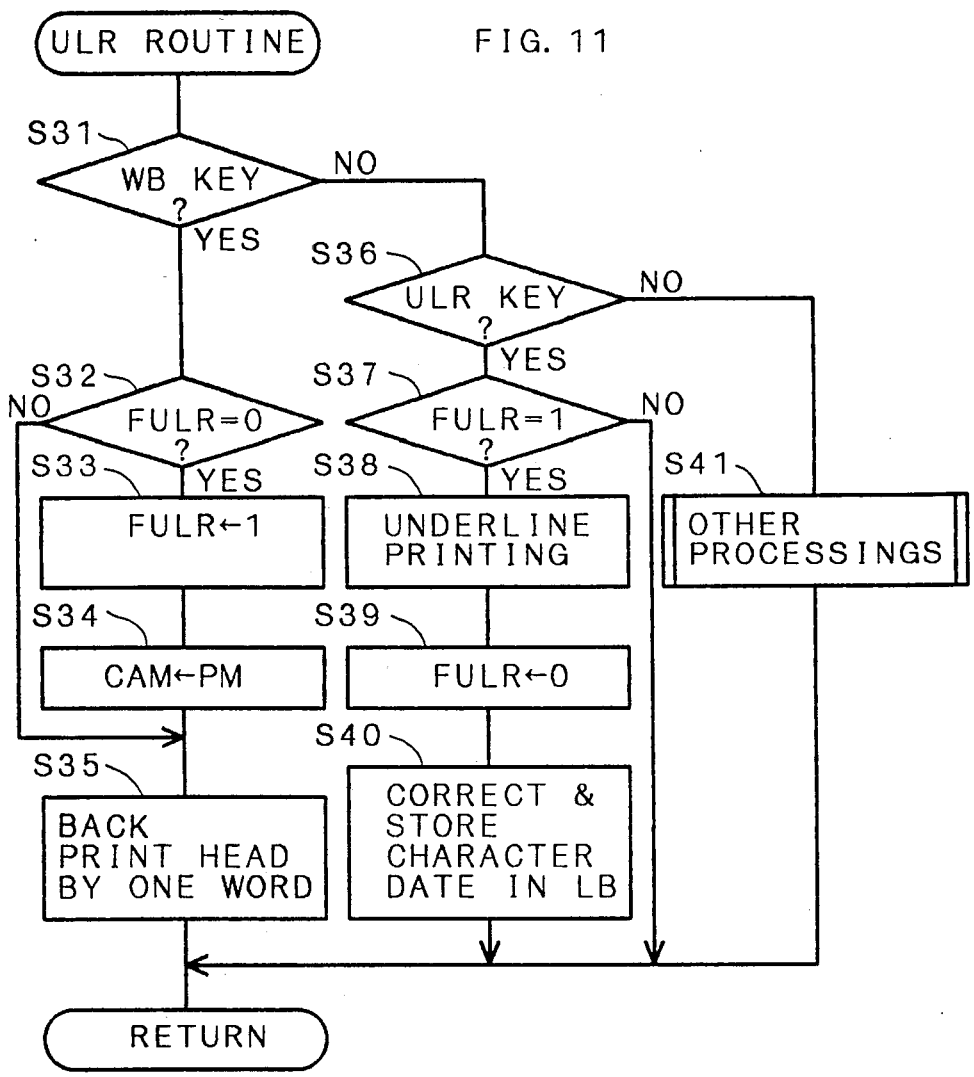
FIG. 11 is a flow chart showing a routine executed upon operation of either a wordback key or an additional underline key.

The aforementioned description shows an example of a function in applying bold printing to the printed character. Hereinafter, an explanation of a function for underlining printed words will be described referring to the flow chart of FIG. 11. The routine of the flow chart can be employed as a processings of other functions at the S17 in the flow chart of FIG. 10.

Entering the present routine, S31 determines whether the operated key is the wordback (WB) key 209. If the WB key 209 is operated, the program proceeds to S32 where it is determined whether an additional underline flag FULR is 0. If the FULR is 0, the program proceeds to S33 where the FULR is set at 1, then at S34, the data in the pointer memory (PM) 334 is stored in a carriage address memory (CAM) which is a memory region provided within the RAM 330. At S35, the carriage 222 is moved to return the print head 227 to the topmost character position of the left neighbor word, where a word is defined by a group of characters separated by a space or a punctuation. If FULR is not 0 at S32, the processing at S35 is then executed.

If S31 determines that the operated key is not the WB key 209, the program goes to S36 where it is determined whether the key is an additional underline (ULR) key (the code key 213 and the underline key 220 are simultaneously operated). If the determination is YES, S37 determines whether the FULR is 1. If the FULR is 1, the program proceeds to S38 where the underline is printed for words running from the current position of print head 227 to the position stored within the CAM. Accordingly, the printed words from the position where the ULR key is operated to the position where the WB key 209 is operated are only underlined without overprinting the words. Even if the print head 227 is slightly out of respective character positions, the word is prevented from becoming bold face. Then at S39, the FULR is reset at 0, and at S40, underline information is furnished to the character data in the LB corresponding to each character of the underlined words. Namely, the second bit of the second byte of the respective character data is set at 1. In case of erasing those words with the correction mechanism, they are completely erased together with the underline.

When the FULR is not 1 at the S37, meaning that the WB key 209 has not been operated, the position to be underlined is not stored at S34. The program is thus terminated with no further processing. If the operated key is determined to be any other key except the ULR key at the S36, the program proceeds to S41 where adequate processing corresponding to the function of the operated key is executed.

In the above embodiment, the desired range of the text to be underlined can be defined by either way of the wordback key operations. One method is that only sequential operations of the wordback key 209 is accepted as defining the range and the other method is that another key operation can be permitted between wordback key operations for defining the range.

The above explanation deals with data within the line buffer, however, a text memory instead of the line buffer can be employed. Though the last embodiment is explained for underlining afterward, the same construction can be utilized for bold printing between the two key operations afterwards.

As many apparently widely different embodiments of this invention may be made without departing from the spirit and scope thereof, it is to be understood that the invention is not limited to the specific embodiments thereof except as defined in the appended claims. For example, the system of the above embodiment can be utilized for converting an underlined character to a non-underlined character with the use of the well-known and above described correction mechanism. This is naturally within the scope of the present invention.

What is claimed is:

1. A printer for printing an attributed character composed of a character part and an attribute part by printing the character part and the attribute part separately, comprising:
   a character memory for storing a plurality of character data each representative of a printed character including information of the character part of the printed character and information of the attribute part of the printed character;
   a pointer memory for storing pointer data representative of an address of the character data in the character memory, the character data corresponding to the printed character at which a print head is located; and
   attribute print means, responsive to a command from outside for printing the attribute part if the printed character at which the print head is located does not have the attribute part and for preventing printing of the attribute part if the printed character has the attribute part.

2. A printer according to claim 1, wherein the attribute part is an underline and the attribute print means comprise:
   detection means responsive to the command from outside for detecting whether the character data in the character memory addressed by the pointer data has information indicating that it has an underline part;
   underline print means for printing the underline part if the detection means detect that the character data does not have the information indicating an underline part, and for preventing printing of the underline part if the detection means detect that the character data has the information indicating the underline part.

3. A typewriter comprising:
   a keyboard provided with at least character keys and an underline mode key;
   a print head for printing a plurality of characters including an underline part;
   a character memory for storing a plurality of character data each representative of a printed character including information of a character part and information of an underline part of the printed character;
   a pointer memory for storing pointer data representative of an address of the character data in the character memory, the character data corresponding to the printed character at which the print head is located;
   detection means responsive to an operation of the underline mode key for detecting whether the character data in the character memory addressed by the pointer data has the information indicating an underline part; and
   underline print means for printing the underline part with the print head if the detection means detect that the character data does not have the information indicating the underline part, and for preventing printing of the underline part if the detection means detect that the character data has the information indicating the underline part.

4. A printer according to claim 1, wherein the attribute print means comprise:
   detection means responsive to a command from outside for detecting whether the character data in the character memory addressed by the pointer data has the information indicating the attribute part;

additional print means for printing the attribute part if the detection means detect that the character data does not have the information indicating the attribute part, and for preventing printing of the attribute part if the detection means detect that the character data has the information indicating the attribute part; and correction means for furnishing the information indicating an attribute part to the character data if the attribute part is printed by the additional print means.

5. A printer according to claim 4, wherein the attribute part is an underline.

6. A typewriter comprising:

a keyboard provided with at least character keys and an additional underline key for adding an underline beneath an already printed character;

a print head for printing a plurality of characters including an underline part;

a character memory for storing a plurality of character data each representative of a printed character including information indicating an underline of the printed character;

a pointer memory for storing pointer data representative of an address of the character data in the character memory, the character data corresponding to the printed character at which the print head is located;

detection means responsive to an operation of the additional underline key for detecting whether the character data in the character memory addressed by the pointer data has the information indicating an underline;

underline print means for printing the underline with the print head if the detection means detect that the character data does not have the information indicating an underline, and for preventing printing of the underline part if the detection means detect that the character data has the information indicating an underline; and correction means for furnishing the underline information to the character data if the underline is printed by the underline print means.

7. A typewriter according to claim 6, wherein the keyboard further includes a wordback key for backing the print head by one printed word, and the typewriter further comprises sequential underlining means, responsive to an operation of the additional underline key after the wordback key is operated once or more than twice, for driving the detection means, the underline print means, and the correction means for every printed character between a first printed character at which the additional underline key is operated and a second printed character at which the wordback key is first operated.

8. A printer to claim 4, wherein the attribute part is a bold face character, and the attribute print means print the attribute part by printing the same character as the character part of the printed character at a small distance therefrom.

9. A typewriter comprising:

a keyboard provided with at least character keys and a bold conversion key for converting an already printed character into a bold face character;

a print head for printing a plurality of characters;

a character memory for storing a plurality of character data each representative of a printed character including an information indicating bold face of the printed character;

a pointer memory for storing pointer data representative of an address of the character data in the character memory, the character data corresponding to the printed character at which the print head is located;

detection means responsive to an operation of the bold conversion key for detecting whether the character data in the character memory addressed by the pointer data has the information indicating bold face;

bold print means for completing a bold character by printing a character corresponding to the character data addressed by the pointer data with the print head at a small distance from the printed character if the detection means detect that the character data does not have the information indicating bold face, and for preventing printing if the detection means detects that the character data has the information indicating bold face; and correction means for furnishing the information indicating bold face to the character data if the bold character is completed by the bold print means.

10. A typewriter according to claim 9, wherein the keyboard further includes a wordback key for backing the print head by one printed word and the typewriter further comprise sequential bold typing means, responsive to an operation of the bold conversion key after the wordback key is operated once or more than twice, for driving the detection means, the bold print means and the correction means for every printed character between a first printed character at which the bold conversion key is operated and a second printed character at which the wordback key is first operated.

* * * * *